United States Patent [19]

Moore et al.

[11] Patent Number: 4,704,330
[45] Date of Patent: Nov. 3, 1987

[54] UNIFORMLY COATED POLYMERIC COMPOSITION

[75] Inventors: Eugene R. Moore, Midland, Mich.; Jon T. Goodman, Atlanta, Ga.

[73] Assignee: The Dow Chemical Company, Midland, Mich.

[21] Appl. No.: 929,565

[22] Filed: Nov. 12, 1986

[51] Int. Cl.$^4$ .............................................. B05D 1/02
[52] U.S. Cl. .................................... 428/407; 427/213; 427/222; 427/422
[58] Field of Search ...................... 427/213, 222, 422; 428/407

[56] References Cited

U.S. PATENT DOCUMENTS

| | | | |
|---|---|---|---|
| 3,255,036 | 6/1966 | Kramer et al. ...................... | 427/213 |
| 4,221,829 | 9/1980 | Vargiu ................................ | 427/222 |
| 4,272,583 | 6/1981 | Hahn et al. ......................... | 428/407 |
| 4,511,603 | 4/1985 | Wallace .............................. | 427/222 |
| 4,517,246 | 5/1985 | Matsuyama et al. ............... | 428/407 |

*Primary Examiner*—Shrive P. Beck
*Attorney, Agent, or Firm*—Douglas N. Deline

[57] ABSTRACT

A particulated thermoplastic polymer having a uniform surface coating of zinc stearate is prepared by contacting the polymer particles with atomized droplets of molten zinc stearate while supporting and conveying the polymer by a moving stream of a gas. Reduced frictional forces allow increased volumes of coated particles to be transported by pneumatic conveyance. Substantially reduced fine particulate generation or "dusting" is observed for the composition.

4 Claims, No Drawings

UNIFORMLY COATED POLYMERIC COMPOSITION

BACKGROUND OF THE INVENTION

The present invention relates to particulated solid thermoplastic polymers having applied thereto a uniform coating consisting of zinc stearate. More particularly, the present invention relates to such a composition of matter having improved lubricity properties and demonstrating reduced dusting or generation of fine particulates either of thermoplastic or of zinc stearate.

Zinc stearate is a known lubricant which is added to numerous synthetic thermoplastics often by compounding or incorporation in a uniform homogeneous manner into the polymer. This is often done by melt blending the preformed polymer and zinc stearate or by addition of zinc stearate during polymerization of the thermoplastic polymer. Suitable methods of compounding in the melted state include the use of compounding extruders, ribbon blenders, double-cone blenders and the like. Alternatively, the zinc stearate may be added to the polymer in a nonuniform manner by measuring the desired amount of solid zinc stearate in a powered or particulated form and dispersing the same in the particulated thermoplastic polymer.

Where zinc stearate is added merely by incorporation of a solid powder in the particulated thermoplastic polymer, transport and handling of the product generally results in separation or settling of the particulated lubricant, and variations in the amount of lubricant and polymer thereby result. This may create nonuniform properties in the resulting polymer melt. Clearly, such a result is greatly undesired.

To overcome this defect zinc stearate is often added to the polymer by one of the previously mentioned techniques to obtain homogeneous mixing. However, these previously known methods for incorporating zinc stearate into thermoplastic polymers have associated therewith other undesirable consequences. Regardless of the method for adding the lubricant, normal abrasion forces encountered by the polymer particles during transport and conveying thereof result in the breakage of the particles or granules thereby creating "fines" i.e. micron sized particles of polymer. In other words, the lubricant, even if highly effective after the polymer is melted, is unable to reduce frictional forces during bulk shipping of the solid particulated polymer because the zinc stearate is not concentrated on the surface of such particles. Even if a surface coating of the lubricant is applied in some manner such that the lubricant does not uniformly and completely coat the surface of such particles, the exposed surfaces thereof may remain subject to dust generation due to the foregoing reasons. Accordingly, whereas zinc stearate incorporated uniformly in the particle by the aforesaid melt blending or other technique achieves a product having suitable molding properties under ideal conditions, under actual use conditions, the overall injection molding properties of such product have been found to be adversely affected due to the presence of the aforementioned fines generated during the shipping and transport thereof. Such adverse effects include uneven polymer melting and agglomerate formation in the molten polymer resulting in erratic flow and injection properties and reduced injection molding rates.

In addition, these fines can also enter the atmosphere thereby producing a fire and inhalation hazard. Accordingly, filtration equipment must be installed near particulated polymer conveying equipment to reduce the amount of such particles. Plugging off of such filters and frequent changing thereof due to excessive levels of dust generation are highly undesirable.

It would be desirable to reduce or eliminate such problems caused by generation of fines.

It would further be desirable to provide a thermoplastic resinous product which after transport or conveyance by polymer handling equipment does not contain therein excessive amounts of fines.

SUMMARY OF THE INVENTION

According to the present invention, there is now provided a composition of matter comprising a particulated solid thermoplastic polymer having applied to the surface thereof a substantially uniform coating consisting of zinc stearate, said coating having been applied by contacting the particulated polymer with atomized droplets of the molten coating while supporting and conveying the particles by a moving stream of a gas.

Because the zinc stearate according to the present invention is evenly and uniformly distributed as a coating layer on the surface of the particles, greatly improved lubrication, and reduced generation of "fines" during transport of the particulated polymers is observed.

DETAILED DESCRIPTION OF THE INVENTION

The thermoplastic polymers employed according to the present invention are unrestricted and include any thermoplastic polymer wherein zinc stearate may be used as a lubricant. Examples include polymers and copolymers of vinyl aromatic monomers, polyolefins, polycarbonates, polyphenylene ethers, polysulfones, polyesters, polymethyl methacrylates, polyvinyl chloride, polyvinylidene chloride, etc. A particularly preferred thermoplastic polymer is polystyrene including either high impact polystyrene or crystalline polystyrene and copolymers of styrene and acrylonitrile including impact modified styrene/acrylonitrile copolymers.

Additional components may be included in the thermo-plastic polymer such as, for example, colorants, pigments, non-elastomeric reinforcing agents, fillers, antioxidants, stabilizers, etc., as long as these do not detrimetrically effect the resulting uniformity of coating and completeness of surface coverage.

The zinc stearate coating is applied according to the present invention by contacting droplets of molten zinc stearate with the particles while conveying the same by a moving stream of a gas. The zinc stearate coating may be atomized by any suitable method such as by pressurizing the molten liquid through a suitable nozzle in order to generate finely particulated droplets thereof. One suitable method for contacting the particulated thermoplastic polymer and the droplets of molten zinc stearate coating is disclosed in U.S. Pat. No. 4,511,603; the teachings of which are incorporated in their entirety herein. It is believed that the motion of the particles in a moving stream of a gas allows uniform coating of the particulated thermoplastic polymer by the zinc stearate while in a supercooled state resulting in highly uniform coating thereof prior to nucleation of crystallization of the zinc stearate.

The addition of some other components, in combination with zinc stearate, has been found to detrimentally affect the resulting uniformity of coating and completeness of surface coverage of the particulated solid thermoplastic polymer. In particular, the presence of polyethylene glycol has resulted in an undesirable non-uniform surface coating. Moreover, polyethylene glycol-containing coating mixtures have been found to produce less permanent coatings due to the absorption of the polyethylene glycol onto other surfaces with which the polymer comes into contact. Loss of such lubricant coating in this manner may result in reduced effectiveness thereof.

The amount of zinc stearate incorporated on the surface of the particulated solid thermoplastic polymer is desirably selected so as to provide improved lubricating properties as measured by reduction in the amount of fines or dust generation during the transport and handling of the resulting product. Desirably, from about 100 to about 2,000 part per million (ppm) based on weight of thermoplastic polymer of zinc stearate is employed. Most desirably from about 800 to about 1,500 ppm of zinc stearate is employed.

Having described the invention, the following examples are provided as further illustrative and are not to be construed as limiting.

EXAMPLE 1

(Comparative)

An injection molding grade general purpose polystyrene resin is produced. This product has 1,200 ppm of zinc stearate added to the polymerizer. The additive is thus present throughout the granules in a homogeneous, apparently soluble distribution. The material is pneumatically transported or "air-veyed" directly into one compartment of a rail car.

EXAMPLE 2

The same product as in Example 1 is produced, except the zinc stearate is not added to the polymerizer internally. Instead, 1,200 ppm of zinc stearate is "hot melt" added by spraying the same onto the surface of the granules as they pass through the air-veyed equipment on the way to a second compartment in the rail car of Example 1. The same airvey system as Example 1 is used, and it is noticed that the air-vey system shows slightly lower pressure drop than for the material of Example 1. The flow is able to be increased several percent before the pressure drop reaches the value of Example 1. Examination of the material of Example 1 under a scanning electron microscope shows granules with many regular surface details. Primarily these details are lines parallel to the direction of flow through the die, a result of minor imperfections in the die. While these lines are clearly visible on product of Example 1, they are absent in the product of Example 2 since they are covered with a thin film of zinc stearate.

EXAMPLE 3

(Comparative)

This example is carried out in a manner similar to that of Example 2, except that instead of adding the zinc stearate as a melt, the 1,200 ppm of zinc stearate is added as a fine powder at the end of the air-vey system as a third compartment in the rail car is being filled with this material. Examination of the granules from this example shows clearly the parallel die marks as did Example 1, with no loss of surface detail. This example does, in addition, show the presence of the tiny zinc stearate crystals on the surface of the granules. It is noted that these crystals are not uniformly distributed from granule to granule. Much of the zinc stearate crystals are noted to be unattached to any granule.

Testing

The rail car is shipped about 2,000 miles to a test site. The vibration of shipping causes much of the "fines" or dust to settle into the lower portion of the compartment which is the first to be unloaded. When the first 500 lbs. of the material of Example 1 is air-veyed into a carton, a large cloud of dust is noted around the carton which is caused by the high level of fines. Visual examination of and running hands through this material shows a very high level of fines. The material of Example 1 is then transported to the hopper of an injection molding machine by air-veying through a system employing a filter to trap dust in the exhaust air. A substantial increase in air pressure caused by dust accumulation on the filter is noted during this time.

The sample is then melted and used to prepare injection molded samples. The operation of the screw injection machine is erratic and the screw return time varies from shot to shot corresponding to a difference in fines level.

Next, the first 500 lbs. of the product from Example 3 is transferred to a similar carton. Again, a dust cloud is created around the box and again a larger amount of fines is visible and becomes more apparent on running hands through the box contents. Air-vey transfer to the screw injection molding machine hopper resulted in a greater pressure drop across the filter than was experienced with the material of Example 1. The pressure drop becomes so high that the filter has to be replaced once during the run. Analysis of the fines show that they contain many times the 1,200 ppm of zinc stearate added to the total polymer, indicating that the zinc stearate is poorly attached and able to shake off the granules. The performance of the injection molding machine screw is erratic, as in Example 1.

When 500 lbs. of the material of Example 2 is transferred to a box, there is much less dust noted in the air around the box than with the resin of Examples 1 and 3. The polymer contains greatly reduced levels of fines. When air-veyed from the box to the hopper, less change in pressure is observed compared to the pressure increase observed for the polymer of Example 1 or 3. During molding of this 500 lbs. of resin, it is noted that the screw return time is more rapid and more consistent than with the resin of Examples 1 or 3.

What is claimed is:

1. A composition of matter comprising a particulated solid thermoplastic polymer having applied to the surface thereof a substantially uniform coating consisting of zinc stearate, said coating having been applied by contacting the particulated polymer with atomized droplets of the molten coating while supporting and conveying the particles by a moving stream of a gas.

2. A composition according to claim 1, wherein the thermoplastic polymer comprises polystyrene.

3. A composition according to claim 1, wherein the coating is applied in an amount of from about 100 to about 2,000 ppm based on thermoplastic polymer weight.

4. A composition according to claim 3, wherein the coating is applied in an amount from about 800 to about 1,500 ppm based on thermoplastic polymer weight.

* * * * *